US006880817B2

(12) United States Patent
Clarke

(10) Patent No.: US 6,880,817 B2
(45) Date of Patent: Apr. 19, 2005

(54) SUPPORT APPARATUS FOR TUNING A SNOWBOARD

(76) Inventor: Robert C. Clarke, 1620 Parker Dr., Mayfield Heights, OH (US) 44124

( * ) Notice: Subject to any disclaimer, the term of this patent is extended or adjusted under 35 U.S.C. 154(b) by 0 days.

(21) Appl. No.: 10/802,250

(22) Filed: Mar. 17, 2004

(65) Prior Publication Data

US 2004/0183244 A1 Sep. 23, 2004

Related U.S. Application Data

(60) Provisional application No. 60/455,507, filed on Mar. 18, 2003.

(51) Int. Cl.[7] .................................................. B23Q 1/00

(52) U.S. Cl. ........................... 269/50; 269/97; 269/906; 269/296

(58) Field of Search .............................. 269/50, 95, 97, 269/296, 906, 236, 98

(56) References Cited

U.S. PATENT DOCUMENTS 3,963,234 A * 6/1976 Bejtlich ...................... 269/296
4,262,890 A * 4/1981 Sisko et al. .................... 269/21
5,848,783 A 12/1998 Weissenborn
5,893,550 A 4/1999 Lassley
6,305,679 B1 10/2001 Brill
6,585,248 B1 * 7/2003 Baud .......................... 269/296

OTHER PUBLICATIONS

Reliable Racing Supply, Inc. webpage printout showing ski vice, 3 pages dated Mar. 16, 2004.

FK Tools webpage printout showing snowboard vice, 1 page dated Mar. 16, 2004.

* cited by examiner

*Primary Examiner*—Lee D. Wilson
(74) *Attorney, Agent, or Firm*—Fay, Sharpe, Fagan, Minnich & McKee, LLP

(57) ABSTRACT

A support apparatus adapted to support a snowboard having a threaded insert during a tuning operation is provided. The support apparatus includes a support member and a board rest supported on the support member. An attachment member extends from the board rest and is adapted to engage the threaded insert of the snowboard. A method of supporting a snowboard is also disclosed.

29 Claims, 8 Drawing Sheets

SUPPORT APPARATUS FOR TUNING A SNOWBOARD

This application claims the benefit of U.S. Provisional Application No. 60/455,507 filed Mar. 18, 2003, which is incorporated herein by reference in its entirety.

This invention relates to the art of snowboarding devices and, more particularly, an apparatus for securely supporting a snowboard during reconditioning and/or repair of the base surface and/or peripheral edges of the snowboard.

BACKGROUND OF THE INVENTION

Snowboards are popularly used for the recreational purpose of gliding on snow, such as on a ski slope, for example. Snowboards are generally well known, and typically have a laminate construction that includes a base material, a laminate body supported on top of the base, and a metal edge.

The base material includes a bottom surface, which is the primary snow-engaging surface. That is, the bottom surface of the base material is what glides across the snow, and it is typically formed from a sintered or extruded, porous base material. One commonly used base material is sintered ultra-high molecular weight polyethylene, sold under the registered trademark P-TEX by IMS Composite Plastics. A wax or other friction reducing material is usually impregnated within the porous base material. As the snowboard flexes, the wax is "squeezed" out of the pores of the base material ensuring that wax is regularly reintroduced onto the bottom surface during use.

The snowboard body is commonly formed from wood, such as aspen or poplar, for example. The body is fixed to the base material and includes numerous threaded inserts to which bindings are typically secured. A metal edge is supported along the body and extends along the periphery of the base material providing a relatively rigid edge to carve through the snow and ice. Though the metal edge material typically extends about the entire periphery of the snowboard, the two generally linear portions along the straight sides of the board are typically referred to as the edges of the board. A top sheet is typically applied along the body opposite the base material. The top sheet can be formed from any one of a variety of materials, such as plastic or fiberglass, for example, and often includes graphics and other decorative details. A side wall can optionally be provided adjacent the edge material and body to improve the aesthetics of the snowboard and further secure the edges to the body.

After use, the base material and the edges of the snowboard typically need reconditioned and sometimes repaired, depending upon the conditions of use, among other things. In the former case, the old wax that had previously been impregnated into the base material is stripped off of the bottom surface and the base material is re-impregnated with wax. Additionally, the edges are commonly tuned by sharpening the corner of the metal edge material. In the latter case, gouges in the base material may need to be filled or in some cases small sections of the base material may need to be replaced. In either case, it is desirable to securely support the snowboard while such reconditioning or repair is being undertaken. Particularly so that the appropriate force and precision of technique can be used during the various processes.

Snowboard support apparatuses have been provided heretofore and commonly include a pair of spaced-apart support stands each having a vertically extending slot therein that is suitable for supporting a snowboard on an edge thereof, as shown in Brill (U.S. Pat. No. 6,305,679), Lassley (U.S. Pat. No. 5,893,550) and Weissenborn (U.S. Pat. No. 5,848,783), for example.

One disadvantage of such arrangements, however, is that the snowboard is commonly supported on its edge at least part of the time. This is particularly disadvantageous once the first of the two edges has been sharpened. Since the sharpened edge is then placed into the respective slots and used to support the snowboards while the other of the edges is being sharpened. As such, a freshly sharpened edge makes contact with each support apparatus and can dull or otherwise damage the freshly repaired edge. This is especially problematic if the snowboard is not rigidly clamped within the support apparatus and is allowed to slide or otherwise move along its edge.

When the base material and/or bottom surface of a snowboard is being reconditioned or repaired using known support stands, the snowboard is supported in a generally horizontal position such that the bottom surface is facing upward. In this position, the top surface of the snowboard that engages the support stands is supported thereon by suction cups, as shown in Lassley, or by anti-slip pads, as shown in Brill and Weissenborn. Various other disadvantages exist with these known arrangements. For one, the suction cups tend to flex when a substantial force is applied to the board, such as the force from scraping the wax from the bottom surface. Additionally, suction cups do not always stick sufficiently to the top surface of the board, depending upon the flatness, smoothness and cleanliness of the snowboard. As such, the board can slip or become otherwise unattached from the suction cups. Furthermore, anti-slip pads tend to become less sticky over time and, as such, it does not take much force to break the adhesion between the top surface and the pads. This, too, is dependent upon the cleanliness of the top surface of the snowboard. Any such conditions that allow undue flexing and/or movement of the snowboard during the repair or reconditioning process are problematic and desired to be avoided or minimized.

Still other snowboard support apparatuses are known that use elastomeric straps connected between the support apparatuses and the bindings of the board, or even clamp along the edges of the board or across the top and bottom surfaces of the snowboard, as shown in Weissenborn, for example. Each of these also have significant disadvantages.

Support stands that use the elastomeric straps still flex and otherwise permit undesired movement of the snowboard during repair or reconditioning. Furthermore, these types of support stands require that the bindings be left on the snowboard. However, such an arrangement is disadvantageous because the bindings act as a heat sink causing cold spots in which the wax impregnation of the base material is less than optimal. And, efforts to minimize such cold spots can result in distortion or melting of the base material due to overheating.

Furthermore, support stands that clamp the snowboard from edge to edge or between the top and bottom surfaces create discontinuous surfaces. This prevents the filing of the entire edge of the snowboard in one pass or the waxing of the entire bottom surface without repositioning the snowboard. This is because in each case, the clamp is in the way. Additionally, many snowboards now have capped or sloped side walls, such that certain support apparatuses that clamp along the sides of the snowboard do not securely hold the same.

BRIEF SUMMARY OF THE INVENTION

A support apparatus in accordance with the invention suitably adapted to support a snowboard having a threaded insert during the tuning of the snowboard is provided. The support apparatus includes a support member and a board rest supported on the support member. An attachment member extends from the board rest and is adapted to engage the threaded insert of the snowboard.

A support apparatus for use in tuning a snowboard having a threaded insert is provided and includes a support member, a support head, a board rest and an attachment member. The support member has a horizontally extending base member and a vertically extending upright attached to the base member. The support head is supported on the upright and includes a top wall. The board rest is supported on the top wall of the support head and has a board-engaging surface with a passage extending through the board rest along the board-engaging surface. The attachment member extends through the passage and is adapted to engage the threaded insert of the snowboard.

A method of supporting a snowboard having a top surface with a threaded insert, a bottom surface and a pair of opposing edges is provided and includes the steps of providing a support apparatus that has a support member, a board rest supported on the support member, and an attachment member from the board rest and adapted to engage the threaded insert of the snowboard; positioning the top surface of the snowboard adjacent the snowboard rest with the threaded insert aligned with the passage; introducing the attachment member into the threaded insert; and, securing the snowboard against the board rest with the attachment member.

DETAILED DESCRIPTION OF THE INVENTION

Figure 1:
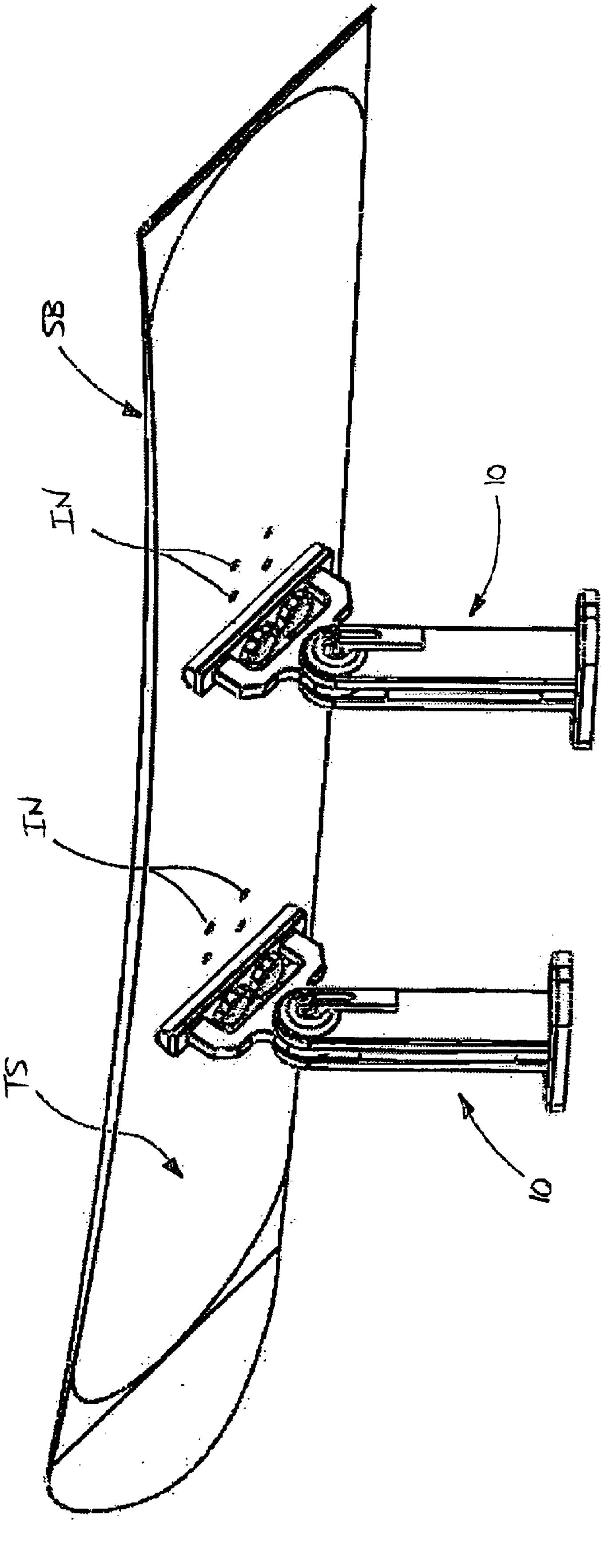
FIG. 1 is a perspective view of one embodiment of a pair of support apparatuses in accordance with the present invention shown in use supporting a snowboard.

Referring to the drawings wherein the showings are for the purpose of illustrating preferred embodiments of the invention only and not for limiting the same, FIG. 1 shows a conventional snowboard SB supported on a pair of spaced-apart support apparatuses 10. The snowboard has a top surface TS engaging each of the support apparatuses and a plurality of threaded inserts IN captured within the snowboard and accessible from top surface TS.

Figure 2:
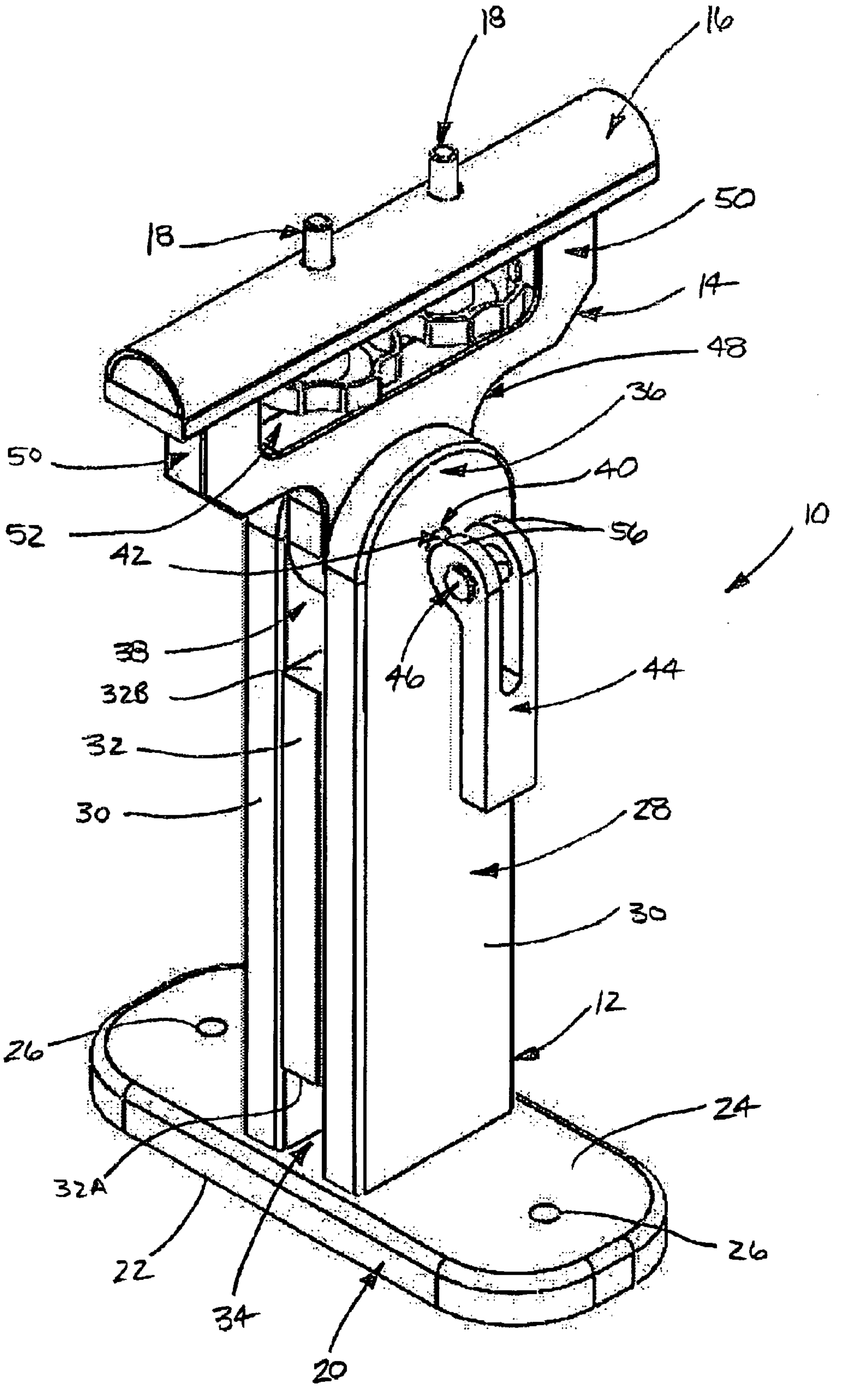
FIG. 2 is a perspective view of one of the support apparatuses in FIG. 1 shown without a snowboard attached.

As shown in FIG. 2, support apparatus 10 includes a support member 12, a support head 14 pivotally attached to support member 12, a board rest 16 supported on support head 14, and a pair of attachment members 18. Support member 12 includes a base member 20 having a bottom surface 22 suitable for mounting on a bench, table or other work surface (not shown). The base member also has a top surface 24 and includes mounting holes 26 extending through the base member for attachment to the work surface, such as by using fasteners (not shown). Support member 12 also includes an upright 28 supported on base member 20 and extending generally vertically upward therefrom. Upright 28 includes two spaced-apart vertical supports 30 and an intermediate support 32 secured between vertical supports 30. Intermediate support 32 has a bottom wall 32A and an upper wall 32B. Additionally, intermediate support 32 is suitably, attached to at least one of vertical supports, and is positioned such that bottom wall 32A is spaced away from base member 20. This forms a lower opening 34 between vertical supports 30, base member 20 and intermediate support 32. Lower opening 34 can be used to receive a portion of a retaining member (not shown), such as a C-clamp, for example, to quickly and/or temporarily secure support apparatus 10 to a bench or other work surface (not shown).

Intermediate support 32 stops short of extending to upper end 36 of vertical supports 30. As such, an upper opening 38 is provided between vertical supports 30 along upper end 36. A pivot passage 40 extends through each of the vertical supports adjacent upper end 36. A pivot member 42, such as a threaded fastener, for example, extends through pivot passages 40 and is captured along the outboard surfaces of vertical supports 30 in any suitable manner.

One example of a suitable arrangement for capturing pivot member 42 includes the use of a cam lever 44 and a cam shaft 46. In this example, pivot member 42 includes a shoulder (not shown), such as a head of a fastener, for example, on one end thereof and a plurality of threads (not shown) on the opposing end thereof. The pivot member extends through the pivot passages until the shoulder engages the outboard surface of one of the vertical supports. A suitable threaded passage (not shown) in cam shaft 46 interengages the threaded end of pivot member 42 such that the pivot member is axially captured between vertical supports 30. Washers (not shown) can optionally be provided adjacent the outboard sides of vertical supports 30 to help distribute the force of the cam lever and shoulder over a larger area of the outboard surfaces of the respective vertical supports. In one suitable arrangement, a washer is attached to the end of the pivot member that is opposite the cam shaft. This can be done in any appropriate manner, such as by welding the washer to the head of the threaded fastener, for example.

Support head 14 is shown in FIG. 2 as having a somewhat Y-shaped configuration with a lower body 48 and a pair of spaced-apart upper arms 50 extending from lower body 48 and forming a notch 52 in the support head. Lower body 48 is received within upper opening 38 between vertical supports 30 and includes a pivot hole 54 (FIG. 3) suitable for engaging pivot member 42. Cam lever 44 is supported on camshaft 46 and can be pivoted thereabout. As cam lever 44 pivots around camshaft 46 and eccentric cam surface 56 engaging the outboard surface of the vertical support, or a washer positioned therebetween, effectively lengthens or shortens pivot member 42 respectively reducing or increasing the axial force compressing lower body 48 of support head 14 between vertical supports 30 of upright 28. As such, cam lever 44 operates as a fast acting clamp for permitting and inhibiting pivotal movement of support head 14 on support member 12. It will be appreciated that the upper portion of each vertical support flex toward one another under the clamping force applied thereacross. Additionally, the size of the upper opening can be varied by using intermediate members of greater or lesser length or otherwise by positioning upper wall 32B closer to or further from upper ends 36. In one suitable configuration, the size of upper opening 38 corresponds to the mechanical properties of the material from which the vertical supports are constructed. For example, material that is more easily flexed, such as wood, for example, could have a smaller upper opening. Whereas, material that is less easily flexed, such as steel or aluminum, for example, might have a larger upper opening.

Figure 3:
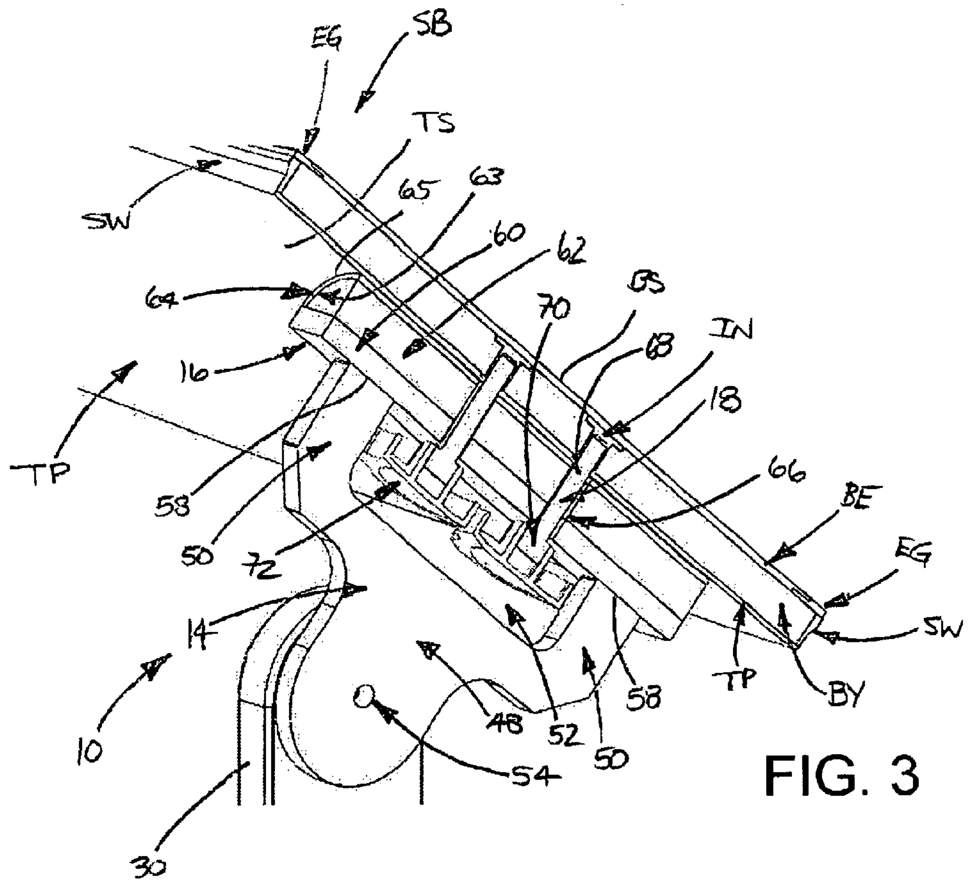
FIG. 3 is a perspective view, in partial cross-section, of the support apparatus shown in FIGS. 1 and 2 with a snowboard supported thereon and disposed at an angle relative to horizontal.

As can be better seen in FIG. 3, board rest 16 is supported on end walls 58 of upper arms 50 in any suitable manner, such as by adhesive or fasteners, for example. Board rest 16 includes a backing member 60, a rest member 62 and a board-engaging material 64. Backing member 60 can be formed from any suitable, relatively rigid material, such as metal, wood or plastic. In one preferred embodiment, backing member 60 is formed from aluminum. Rest member 62 is supported on backing member 60 and likewise can be formed from any suitable, relatively rigid material, such as metal, wood or plastic, for example. In one preferred embodiment, rest member 62 is formed from a material, such as wood, for example, that has a relatively low thermal conductivity relative to most metals, such as a thermal conductivity of less than about 10 BTU/(h·ft$^2$·° F.·ft), for example. It will be appreciated, however, that forming rest member 62 from a material that has a relatively low thermal conductivity, while desirable, is, nevertheless, optional. Rest member 62 is shown as having a curvilinear rest surface 63, though it will be appreciated that any suitable shape can be used. Rest member 62 can optionally be covered by a soft, non-marring, board-engaging material 64 having a board-engaging outer surface 65. The inclusion or use of board-engaging material 64 to cover rest member 62 is particularly useful where the rest member is formed from a material that could undesirably damage the top sheet of the snowboard. Board-engaging material 64 can be of any suitable, natural or synthetic material, such as rubber, cloth, leather or plastic, for example. In one preferred embodiment, board rest material 64 is formed from a polymeric coating material, such as a suitable dip coating material, for example. One example of a suitable dip coating material is available under the trade name PLASTI-DIP from Plasti Dip International, Inc. of Blaine, Minn.

Figure 4:
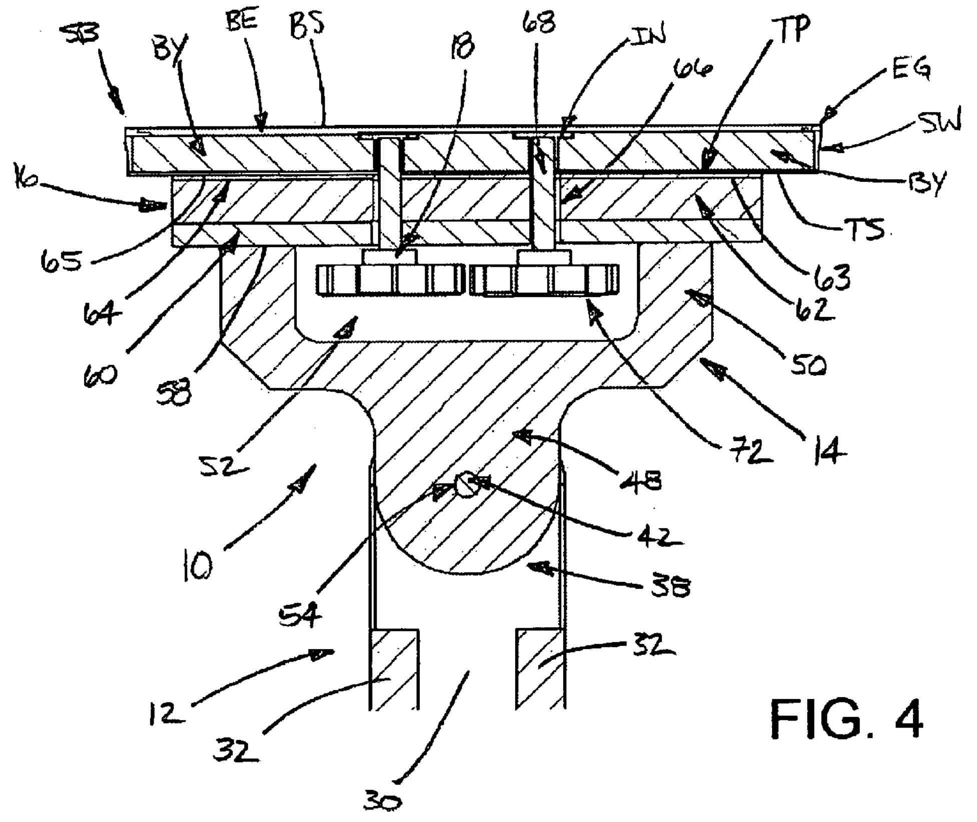
FIG. 4 is a side view, in partial cross-section, of the support apparatus and snowboard shown in FIG. 3 with the snowboard disposed substantially horizontally.

As shown in FIGS. 3 and 4, top sheet TP of snowboard SB includes top surface TS that engages surface 65 of board-engaging material 64 on board rest 16. The snowboard is secured to the board rest by attachment members 18 that extend from the board rest. It will be understood that the attachment members can be operatively engaged with the board rest in any suitable manner without departing from the scope and interest of the present invention. In one suitable embodiment, board rest 16 includes two spaced-apart passages 66 through which attachment members 18 extend. The attachment members are captured between board rest 16 and lower body 48 within notch 52, and are upwardly displaceable against backing member 60 of the board rest to project through board-engaging member 62. Preferably, upper arms 50 are of sufficient length such that the attachment members, when fully received in notch 52, do not project outwardly from board rest 16.

It will be appreciated that different snowboard manufacturers use different insert patterns, configurations, and/or center distances between inserts IN on their respective snowboards. For example, one manufacturer might use a three-insert pattern with center distances of 40 mm while another manufacturer might use a four-insert pattern with center distances of 42 mm. As such, it is desirable for a single support apparatus to be able to support two or more of such patterns, configurations and/or center distances. This can be accomplished in any suitable manner, such as by providing one or more attachment members that can be re-positioned relative to the board rest. In one example, passages 66 in board rest 16 are simply oversized holes that provide sufficient clearance for the attachment members to accommodate various insert patterns and/or distances. Alternately, elongated slots of sufficient length to accommodate a variety of center distances can be used as passages 66. It will be further appreciated that one passage 66 can be a generally cylindrical hole while the other passage is an elongated slot, or both passages can be holes or elongated slots.

Attachment members 18 are shown in FIGS. 3 and 4 as being bolts or screws 68 having a head 70. A knob 72 is fitted over and secured to head 70 in any suitable manner, such as by a friction fit therewith, for example. It will be appreciated that any suitable attachment member can be used without departing from the principles of the present invention. The attachment members are extended through backing member 60 and board-engaging member 62 along passages 66 and threadably engage inserts IN in body BY of snowboard SB by the rotation of knobs 72. The knobs are rotated until the snowboard is securely attached to the support apparatus, at which point the repair or reconditioning process can be initiated. It will be appreciated from FIGS. 1, 3 and 4 that the snowboard is supported such that bottom surface BS of base material BE, edges EG and side walls SW are unobstructed by the support apparatus.

Figure 6:
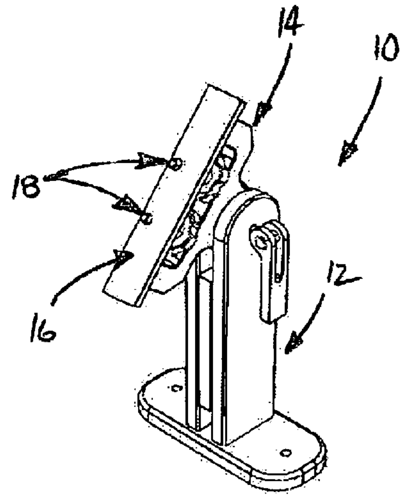
Figure 7:
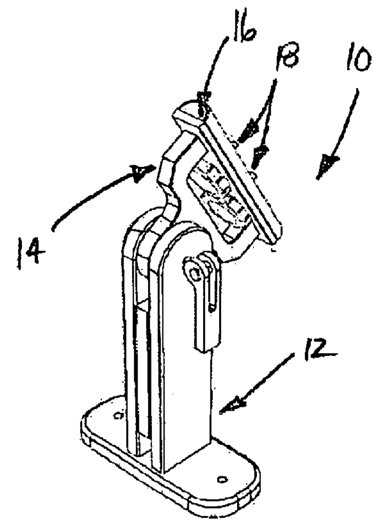
Figure 8:
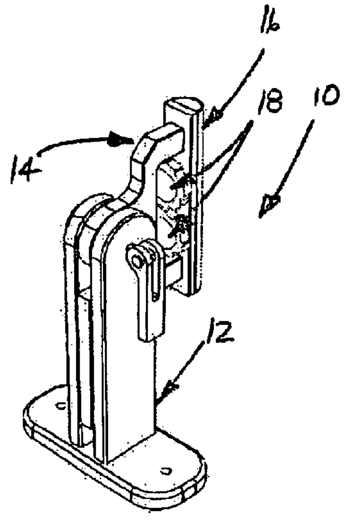

Depending upon personal preference and the area or component of the snowboard being reconditioned or repaired, the snowboard can preferably be angularly positioned through an angle of at least about 180 degrees, as shown in FIGS. 5–8. That is, in working on one edge, the support apparatuses can be arranged in the configuration shown in FIG. 5 such that the board is generally vertical and the edge being worked on is up. In working on the opposing edge, the support apparatuses can be configured as shown in FIG. 8 such that the snowboard is again generally vertical, but the opposing edge is up. It will be appreciated that this arrangement allows for both edges of the snowboard to be worked on without removing the snowboard itself from the support apparatuses.

Figure 5:
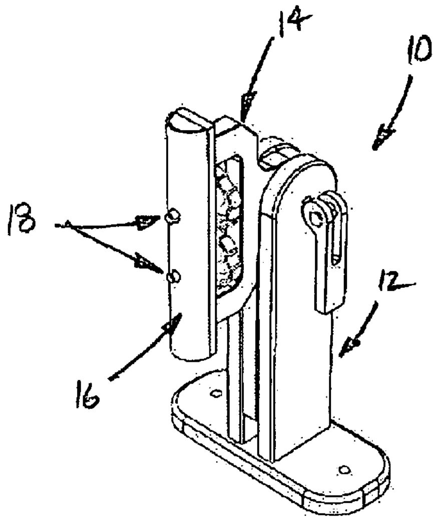
FIGS. 5–8 are perspective views of the support apparatus shown in FIG. 2 with the board rest rotated into various angular positions.

Additionally, as personal preference dictates, the support apparatuses can be configured at an infinite number of positions between that shown in FIG. 5 and that shown in FIG. 8, such as the positions shown in FIGS. 6 and 7, for example. This provides the repair person with the flexibility to position the snowboard as he or she prefers. For example, when working on the bottom surface of the snowboard, the technician may desire to have the board tipped toward him or her at about 5 degrees from horizontal.

Figure 9:
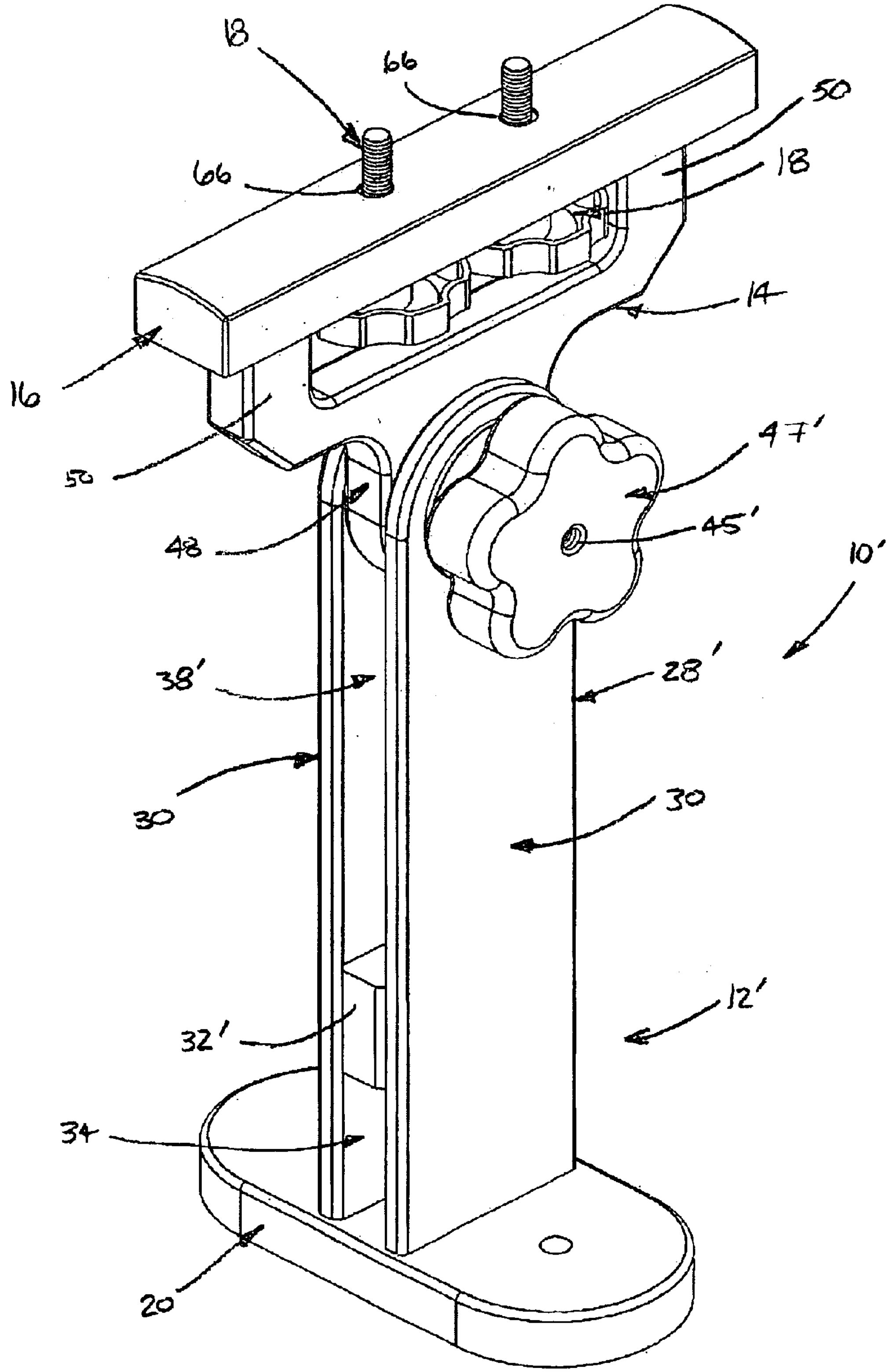
FIG. 9 is a perspective view of an alternate embodiment of a support apparatus.
Figure 10:
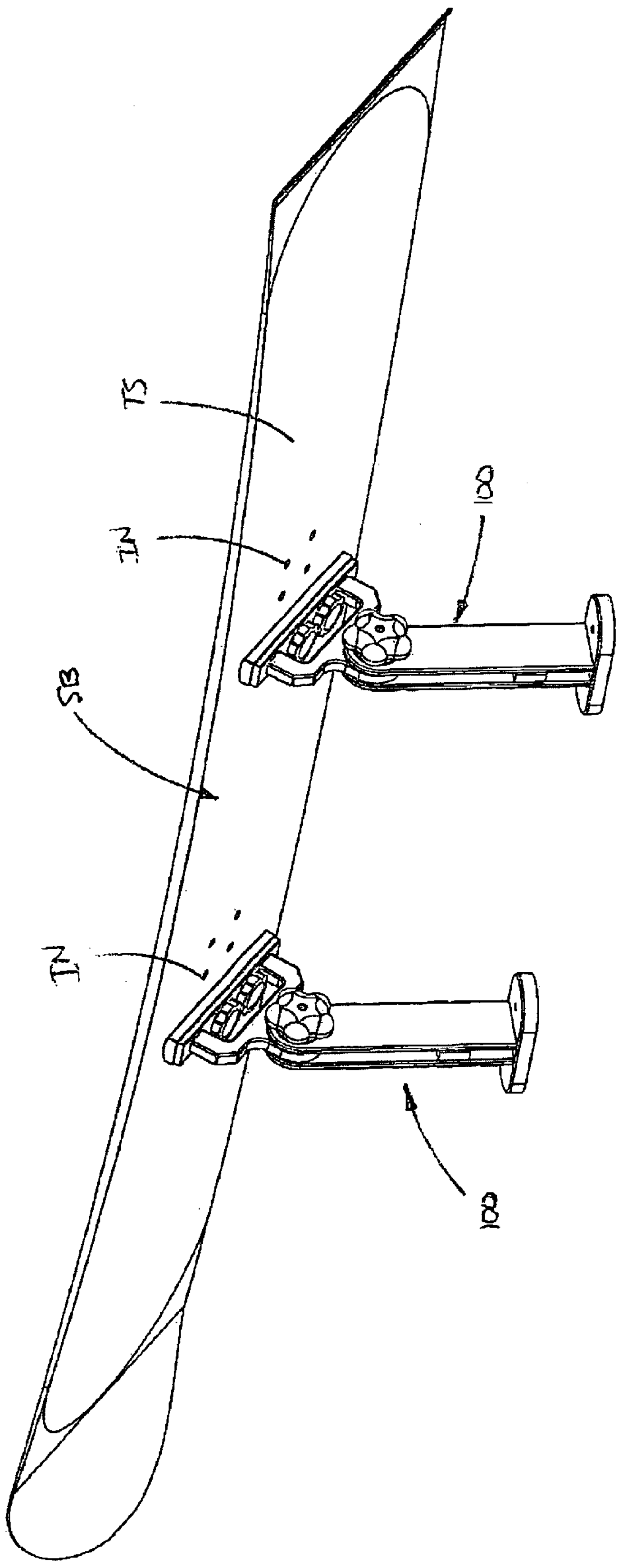
FIG. 10 is a perspective view of another alternate embodiment of a pair of support apparatuses shown in use supporting a snowboard.

An alternate embodiment of a support apparatus 10' is shown in FIG. 9. It will be appreciated that support apparatus 10' is substantially similar to support apparatus 10 shown in and discussed with regard to FIGS. 1–8. As such, like item numbers will be used for like items, and new or modified items will include primed (') item numbers.

Support apparatus 10' includes a support member 12', a support head 14 rotatably attached to support member 12', a board rest 16 supported on support head 14, and attachment members 18 extending from board rest 16. Support member 12' includes a base member 20 and an upright 28' at least partially formed from a pair of vertical supports 30 extending upwardly from the base member. Upright 28' also includes one or more intermediate supports 32' secured between the vertical supports in a suitable manner. It will be appreciated from FIG. 9 that intermediate supports 32' are substantially shorter in length than intermediate supports 32 shown in and discussed with regard to FIGS. 1–8. However, bottom wall 32A' is spaced a similar distance from the top wall of base member 20 to bottom wall 32A in support apparatus 10. As such, lower opening 34 is substantially similar to the lower opening in support apparatus 10. However, upper opening 38' shown in FIG. 9 is substantially larger than upper opening 38 of support apparatus 10 due to the shorter length of intermediate member 38'.

A pivot passage 42 (FIG. 2) extends through each of the vertical supports, and a pivot hole 54 (FIGS. 3 and 4) in lower body 48 of support head 14 is in substantial alignment with the pivot passages. A pivot member 42 (FIG. 4) extends through the pivot passages and pivot hole and threadably engages a threaded passage 45' of a clamping knob 47'. It will be appreciated that the clamping knob 47' is used in place of cam lever 44 and cam shaft 46 of support apparatus 10. Clamping knob 47' is simply rotated relative to the pivot member to increase of decrease the clamping force of vertical supports 30 against lower body 48 of support head 14. Attachment members 18 are shown in FIG. 9 as extending through passages 66 in board rest 16, as discussed above.

Another alternate embodiment of a support apparatus 100 is shown in FIGS. 10–13. A conventional snowboard SB is supported on a pair of space-apart support apparatuses 100 in FIG. 10. The snowboard has a top surface TS engaging each of the support apparatuses and a plurality of threaded inserts IN captured within the snowboard and accessible from the top surface.

Figure 11:
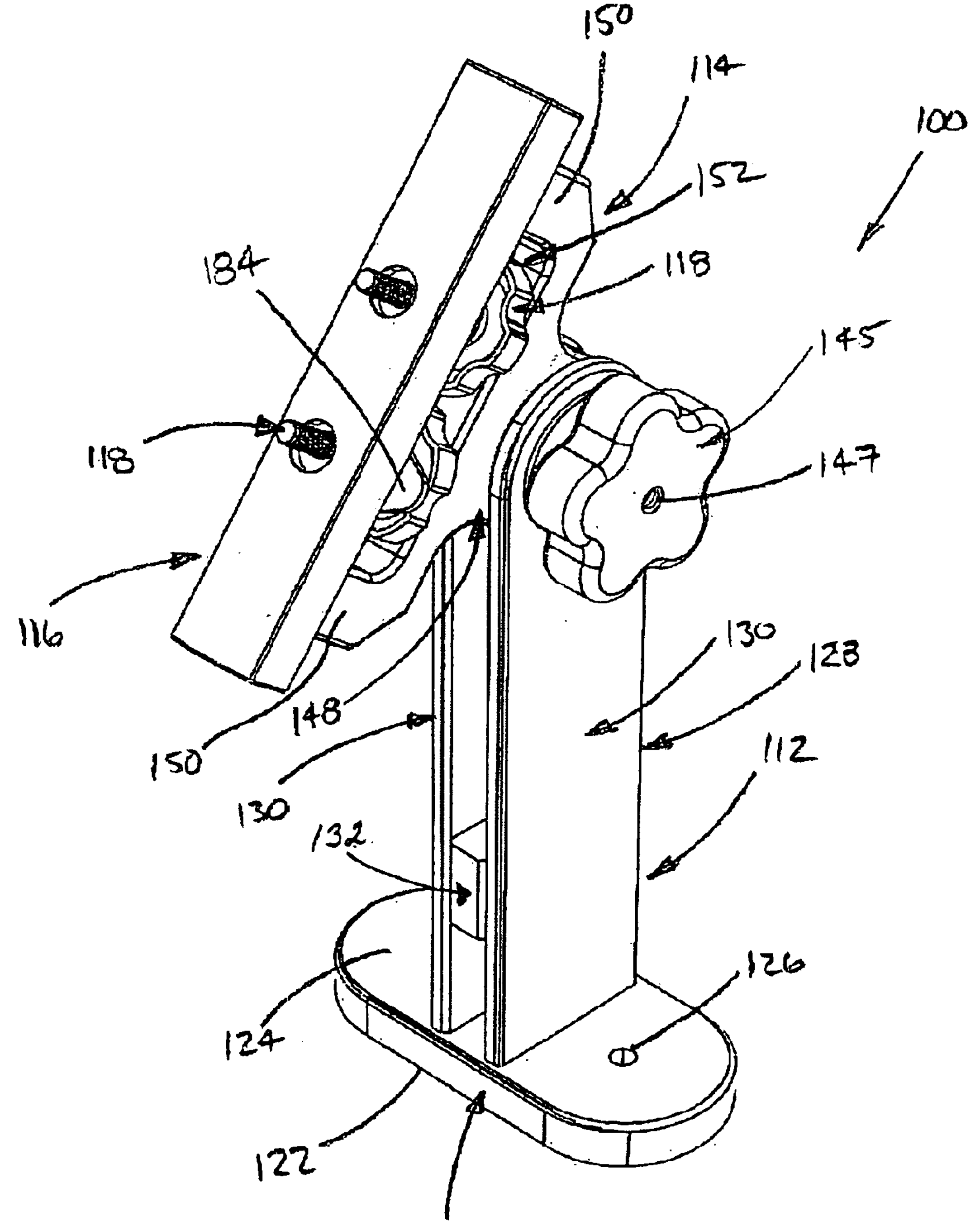
FIG. 11 is a perspective view of one of the support apparatuses in FIG. 10 shown with the board rest thereof disposed at an angle relative to horizontal and without a snowboard attached.

As shown in FIG. 11, support apparatus 100 includes a support member 112, a support head 114 pivotally attached to support member 112, a board rest 116 supported on support head 114, and a pair of attachment members 118. Support member 112 includes a base member 120 and an upright 128 at least partially formed from a pair of spaced-apart vertical supports 130 extending from base member 120. The base member also includes a bottom surface 122, a top surface 124, and mounting holes 126 extending through the base member between the top and bottom surfaces. Upright 128 also includes at least one intermediate support 132 secured between vertical supports 130. This at least partially forms a lower opening 134 adjacent base member 120. Each of vertical supports 130 has an upper end 136 forming an upper opening 138 therebetween in conjunction with intermediate support 132. A pivot passage (not shown) extends through each of the vertical supports.

Support head 114 includes a lower body 148 and upper arms 150 extending from the lower body and forming a notch 152 therebetween. A pivot hole 154 extends through lower body 148 and is substantially aligned with pivot passages 140 to receive a pivot member 142 to pivotally mount support head 114 on support member 112. A clamping knob 145 is secured to a threaded end (not shown) of the pivot member and includes a plurality of threads 147 for engaging the pivot member. Upper arms 150 include end walls 158 to which board rest 116 is secured.

Figure 12:
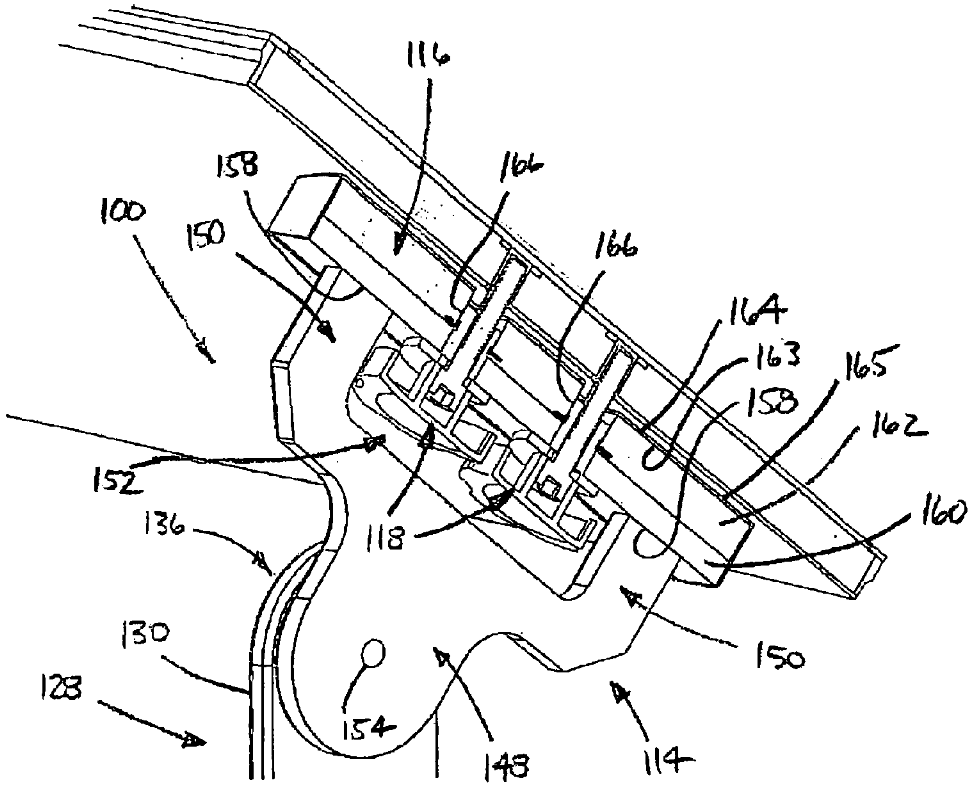
FIG. 12 is a perspective view, in partial cross section, of the support apparatus in FIGS. 10 and 11 with a snowboard supported thereon and disposed to an angle relative to horizontal.
Figure 13:
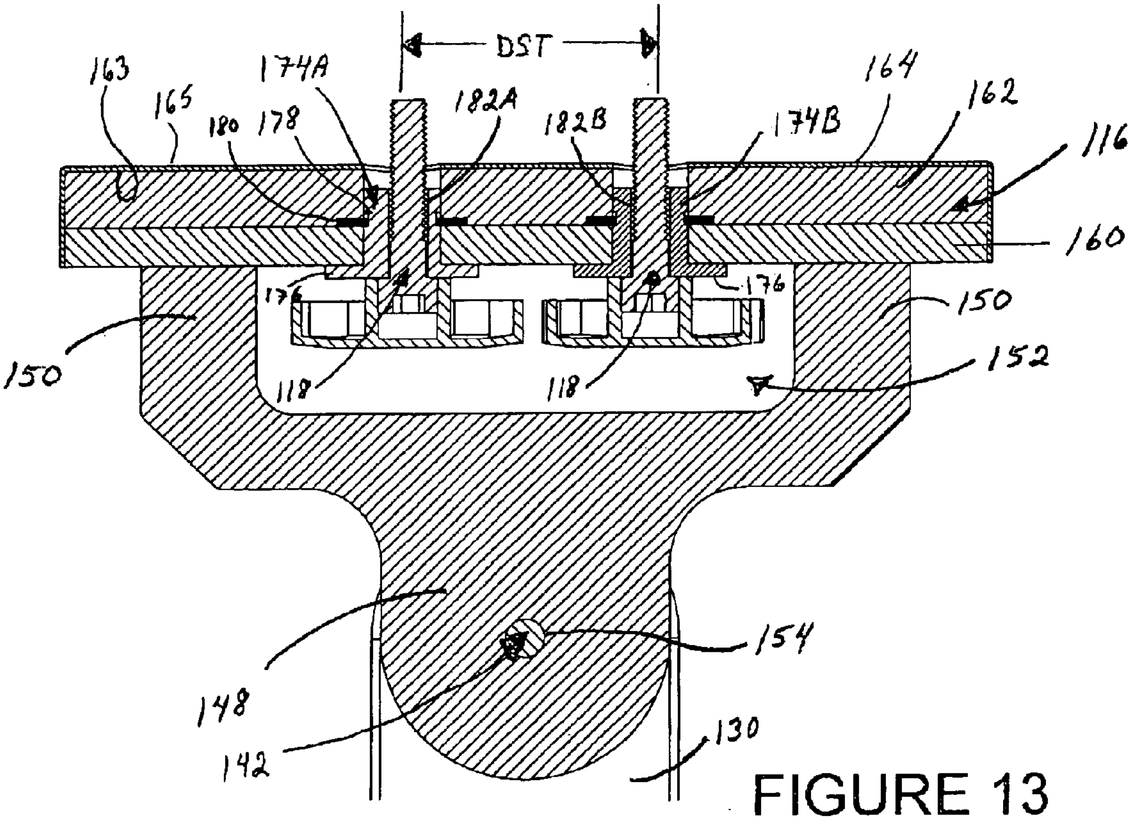
FIG. 13 is a side view, in partial cross section, of the support apparatus in FIG. 12 with the board rest disposed substantially horizontally.

As can be better seen in FIGS. 12 and 13, board rest 116 includes a backing member 160, a board rest member 162 having a curvilinear rest surface 163, and a board-engaging material 164 disposed along rest member 162 to provide a non-marring surface for engaging the top sheet of the snowboard.

Attachment members 118 can extend from board rest 116 in any suitable manner to engage the inserts of a snowboard and secure the same against the board rest. In one embodiment, passages 166 extend through board rest 116 and attachment members 118 extend from within notch 152 through passages 166. In at least one position, the attachment members project from board rest 116 adjacent board-engaging material 164. Alignment members 174A and 174B are received in passages 166 and include a flange portion 176 adjacent backing member 160 of board rest 116. Alignment members 174A and 174B each optionally includes a groove 178 adapted to receive a retaining ring 180 or other suitable retaining member, which secures the alignment member on backing member 160. A hole 182A and 182B is respectively provided through each of alignment members 174A and 174B. The hole is preferably suitably dimensioned to receive a bolt or screw 168 that at least partially forms attachment member 118. In one preferred embodiment, a hole 182A of alignment member 174A is disposed off center relative to the outside diameter of the alignment member. As such, rotation of alignment member 174A within passage 166 permits the center distance, shown as dimension DST in FIG. 13, to be adjusted for variations in board construction and/or configurations from manufacturer to manufacturer. An optional lever or projection 184 (FIG. 11) extends from flange portion 176 of alignment member 174A and is useful for assisting in adjusting the center distance DST between the alignment members. In one preferred embodiment, lever 184 can be moved between two or more positions to provide two or more predetermined center distances DST conforming to known snowboard configurations.

While the invention has been described with reference to the preferred embodiments and considerable emphasis has been placed herein on the structures and structural interrelationships between the component parts of the embodiments disclosed, it will be appreciated that other embodiments of the invention can be made and that many changes can be made in the embodiments illustrated and described without departing from the principles of the invention. Obviously, modifications and alterations will occur to others upon reading and understanding the preceding detailed description. Accordingly, it is to be distinctly understood that the foregoing descriptive matter is to be interpreted merely as illustrative of the present invention and not as a limitation. As such, it is intended that the invention be construed as including all such modifications and alterations insofar as they come within the scope of this disclosure.

What is claimed is:

1. A support apparatus suitably adapted to support a snowboard having a threaded insert during tuning thereof, said apparatus comprising:

a support member;

a support head mounted on said support member for pivotal movement about a pivot axis;

a board-engaging surface extending along said support head generally opposite said support member; and, an attachment member supported by said support head and adapted to engage the threaded insert of the snowboard, said attachment member extending generally transverse said pivot axis.

2. A support apparatus according to claim 1, wherein said support member includes a base member suitably adapted to engage a work surface.

3. A support apparatus according to claim 2, wherein said support member includes an upright extending from said base member.

4. A support apparatus according to claim 1 further comprising a clamping assembly operatively engaging said support head and said support member, said clamping assembly adapted to selectively limit pivoting of said support head about said pivot axis.

5. A support apparatus according to claim 1 further comprising a board rest supported on said support head.

6. A support apparatus according to claim 5, wherein said board engaging surface extends along at least a portion of said board rest.

7. A support apparatus according to claim 6, wherein said board rest includes a passage extending therethrough and said attachment member extends through said passage.

8. A support apparatus suitably adapted to support a snowboard having a threaded insert during tuning thereof, said apparatus comprising:

a support member including a base member suitably adapted to engage a supporting work surface and an upright extending from said base member, said upright including a pair of vertical supports in spaced relation to one another forming an opening therebetween;

a board rest supported on said support member; and, an attachment member extending from said board rest and adapted to engage the threaded insert of the snowboard.

9. A support apparatus according to claim 8, wherein said upright includes an intermediate member secured at least partially within said opening between said vertical supports.

10. A support apparatus suitably adapted to support a snowboard having a threaded insert during tuning thereof, said apparatus comprising:

a support member;

a support head pivotally mounted on said support member;

a board rest supported on said support member; and, an attachment member extending from said board rest and adapted to engage the threaded insert of the snowboard.

11. A support apparatus according to claim 10, wherein said support head is pivotable through an angle of at least about 180 degrees.

12. A support apparatus according to claim 10, wherein said support member includes an upright at least partially formed from a pair of vertical supports in spaced relation to one another at least partially defining an opening therebetween, and at least a portion of said support head is disposed within said opening.

13. A support apparatus according to claim 10, further comprising a clamping assembly operatively engaging said support head and said support member and adapted to selectively permit pivoting of said support head relative to said support member.

14. A support apparatus according to claim 13, wherein said support member includes a first clamping hole, said support head includes a second clamping hole in substantial alignment with said first clamping hole, and said clamping assembly includes a clamping member that extends through at least a portion of one of said first and second clamping holes.

15. A support apparatus according to claim 14, wherein said clamping assembly includes a cam shaft engaging said clamping member and a cam lever engaging said cam shaft, said cam lever being positioned adjacent one of said support member and said support head.

16. A support apparatus according to claim 15, wherein said cam lever includes a curvilinear cam surface eccentrically disposed on said cam lever in relation to said cam shaft.

17. A support apparatus according to claim 10, wherein said board rest includes a passage extending therethrough and said attachment member extends through at least a portion of said passage.

18. A support apparatus according to claim 17 further comprising a support head pivotally mounted on said support member.

19. A support apparatus according to claim 18, wherein said support head includes a notch adjacent said board rest receiving at least a portion of said attachment member.

20. A support apparatus according to claim 17 further comprising an alignment member extending at least partially into said passage.

21. A support apparatus according to claim 20, wherein said alignment member includes a hole extending therethrough and at least a portion of said attachment member extends through said hole.

22. A support apparatus according to claim 21, wherein said alignment member has a first axis and said hole has a second axis, said first and second axes being in spaced relation to one another.

23. A support apparatus for use in tuning a snowboard having a threaded insert, said apparatus comprising:

a support member having a horizontally-extending base member and a vertically-extending upright attached to said base member;

a support head pivotally supported on said upright and having a top wall;

a board rest supported on said top wall and having a board-engaging surface and a passage extending through said board rest along said board-engaging surface; and, an attachment member extending through said passage and adapted to engage the threaded insert of the snowboard.

24. A support apparatus according to claim 23, wherein said support head is adapted for pivotal movement through an angle of at least about 180 degrees.

25. A support apparatus according to claim 23 further comprising a clamping assembly operatively engaging said support head and said support member, and adapted to selectively permit pivoting of said support head relative to said support member.

26. A method of supporting a snowboard having a top surface with a threaded insert, a bottom surface, and a pair of opposing edges, said method comprising steps of:

a) providing a support apparatus having a support member, a support head pivotally mounted on said support member, a board rest supported on said support head, and an attachment member extending from said board rest and adapted to engage the threaded insert of the snowboard;

b) positioning the top surface of the snowboard adjacent said board rest with the threaded insert facing toward said board rest;

c) introducing said attachment member into said threaded insert;

d) securing the snowboard against said board rest with said attachment member; and, e) moving the snowboard into a first tuning orientation by pivoting said support head relative to said support member while the snowboard is secured along said board rest.

27. A method according to claim 26 further comprising a step of substantially aligning said attachment member with said threaded insert prior to step c).

28. A method according to claim 26, wherein one of the bottom surface and the opposing edges is accessible in said first tuning orientation, said method further comprising a step of moving the snowboard into a second tuning orientation by pivoting said support head relative to said support member such that another of the bottom surface and the opposing edges is accessible while the snowboard is secured to said board rest.

29. A method according to claim 26, wherein step e) is performed without removing said attachment member from said threaded insert.

* * * * *